United States Patent [19]
Lee et al.

[11] 3,774,945
[45] Nov. 27, 1973

[54] SEQUENTIALLY POSITIONED TRACK SANDING HOPPER OUTLETS

[76] Inventors: Robert P. Lee; Poy Lee, both of 52 Tennyson St., Somerville, Mass. 02145

[22] Filed: Nov. 12, 1971

[21] Appl. No.: 198,375

[52] U.S. Cl.......................... 291/38, 291/23, 291/25
[51] Int. Cl... B60b 39/10, B61c 15/10, B61h 11/00
[58] Field of Search ..................... 291/3, 23, 38, 25

[56] References Cited
UNITED STATES PATENTS

| | | | |
|---|---|---|---|
| 3,606,420 | 9/1971 | Hulstrom et al. | 291/3 |
| 1,745,705 | 2/1930 | Nordquist | 291/38 X |
| 3,034,816 | 5/1962 | Thompson | 291/23 |
| 2,625,417 | 1/1953 | Sundheim | 291/3 |
| 2,099,283 | 11/1937 | Stevenson | 291/38 X |
| 3,399,917 | 9/1968 | McLean | 291/38 |

Primary Examiner—Robert G. Sheridan
Assistant Examiner—Howard Beltran
Attorney—David M. Driscoll

[57] ABSTRACT

This invention consists of a plastic sand tank mounted in the front of each wheel of a vehicle, the aforesaid sand tank having a vertically disposed valve therein that is activated by means of an electromagnet connected by one or more wires to a brake pedal switch as well as to a master off and on switch and to a source of electricity carried by the said vehicle.

7 Claims, 8 Drawing Figures

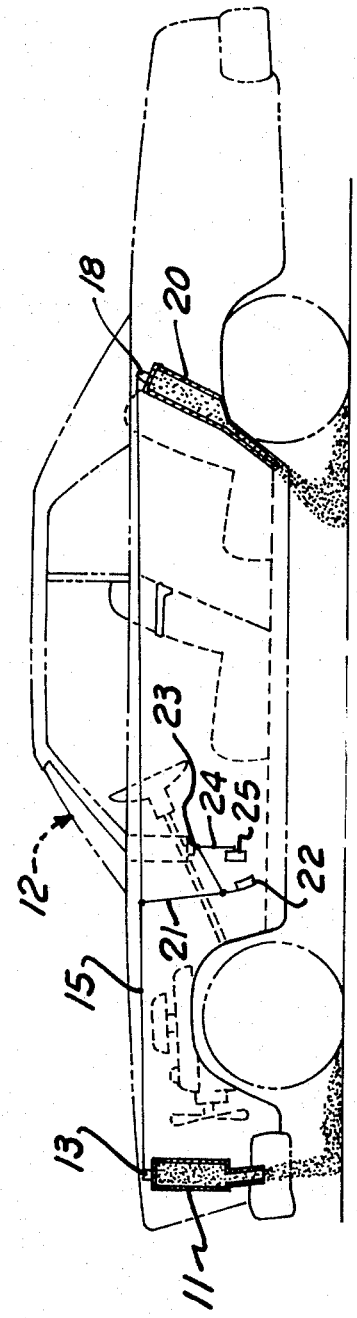
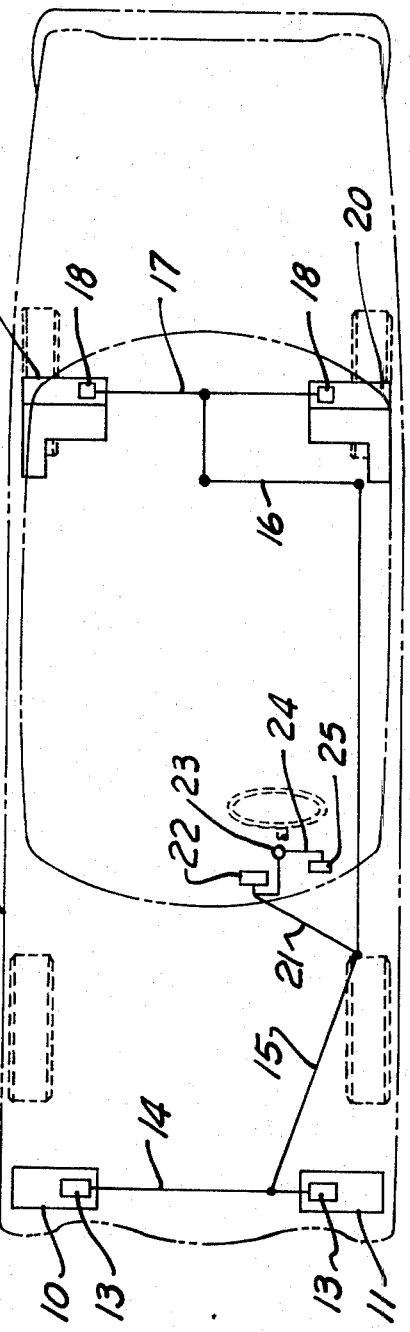
INVENTOR
ROBERT P. LEE
POY LEE

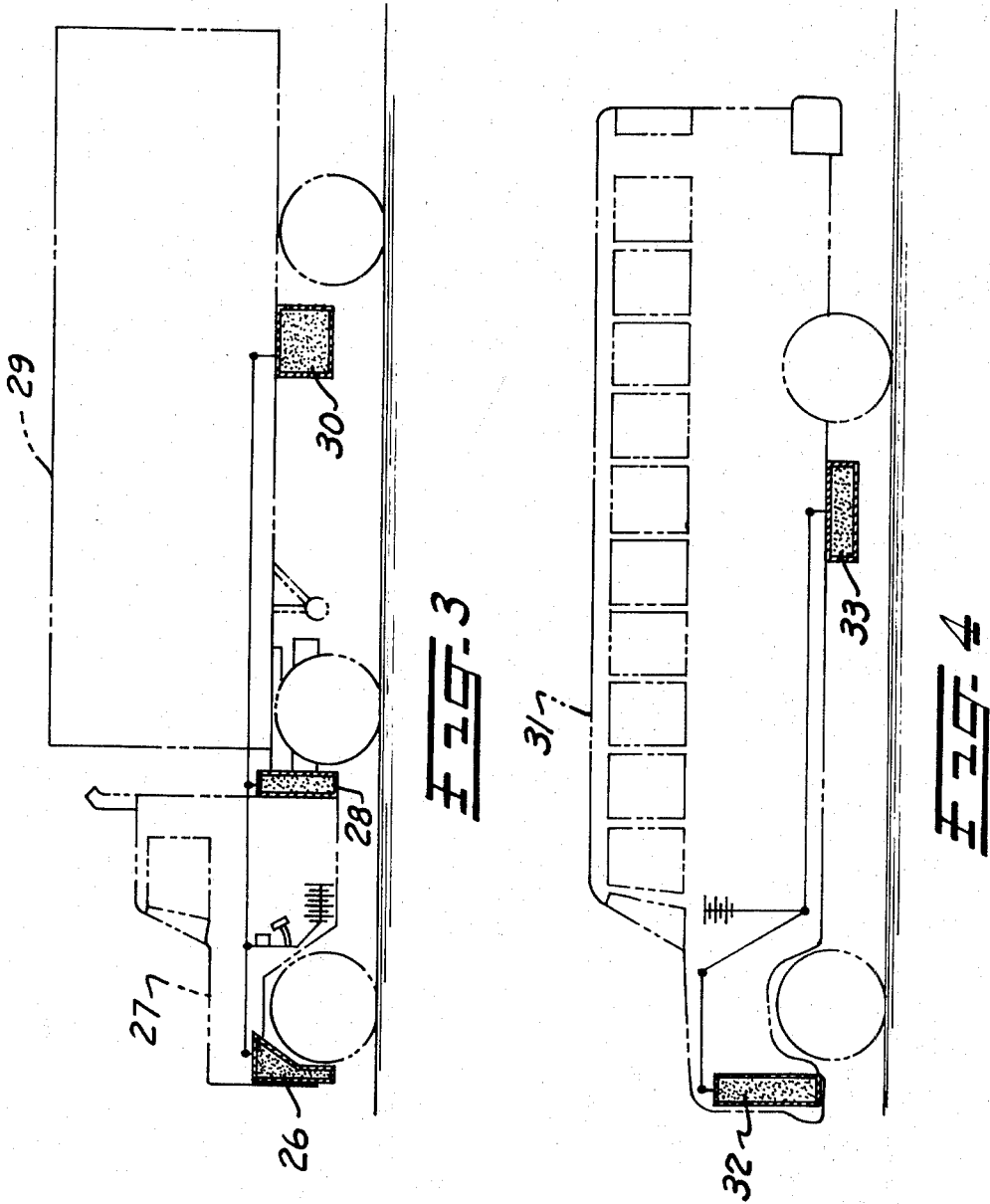

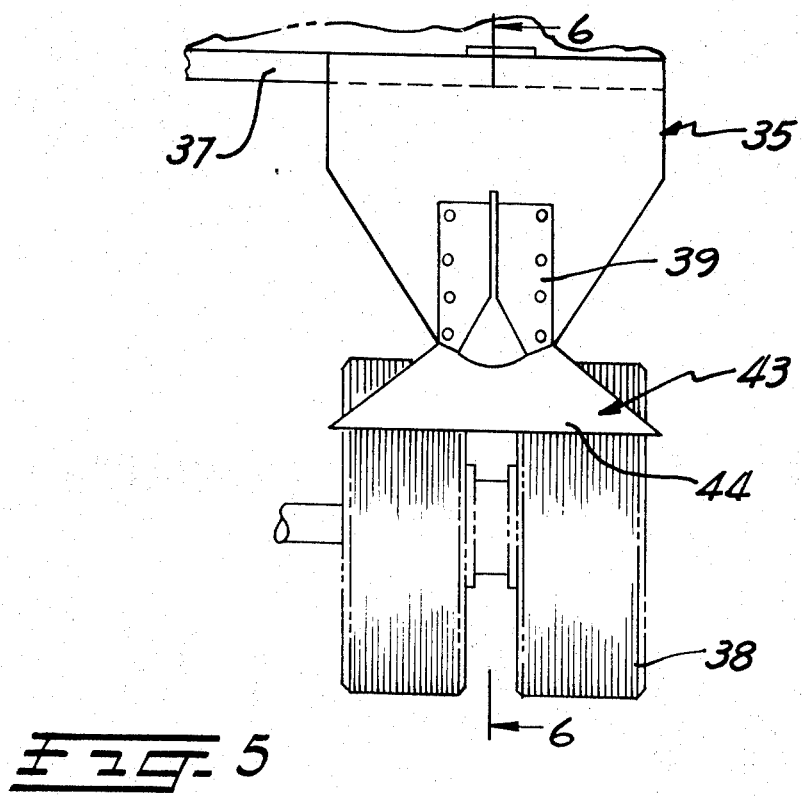
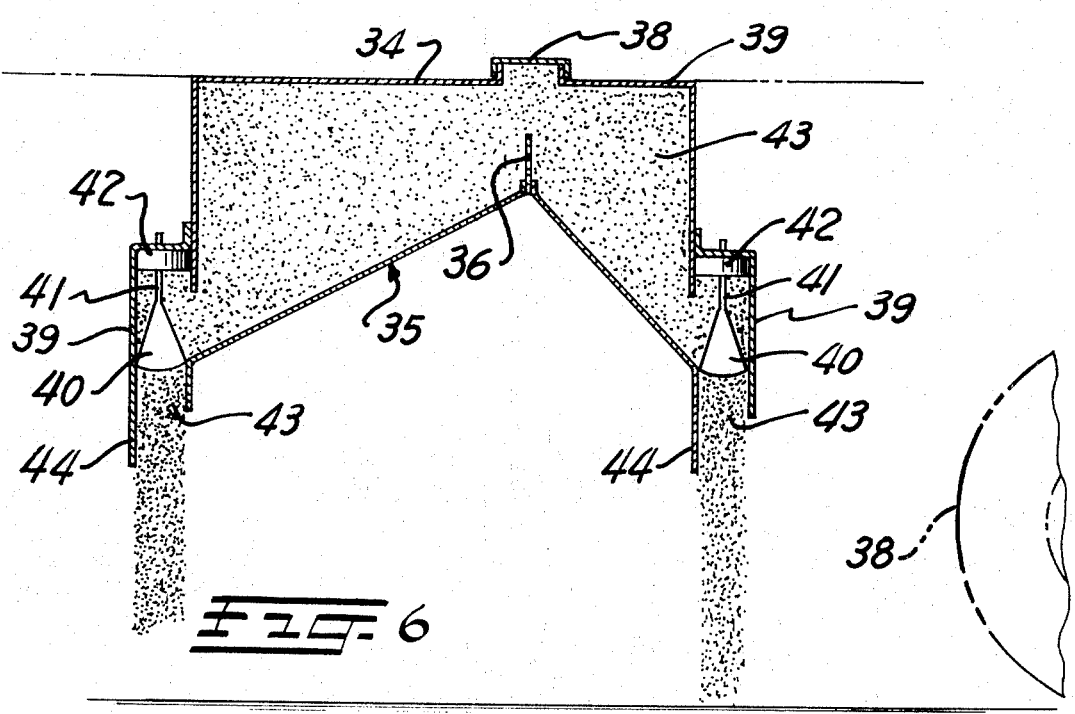

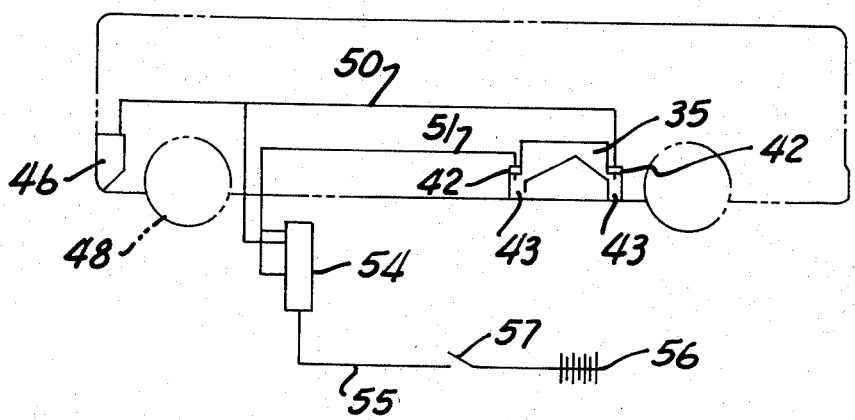
𝐹𝑖𝑔. 7
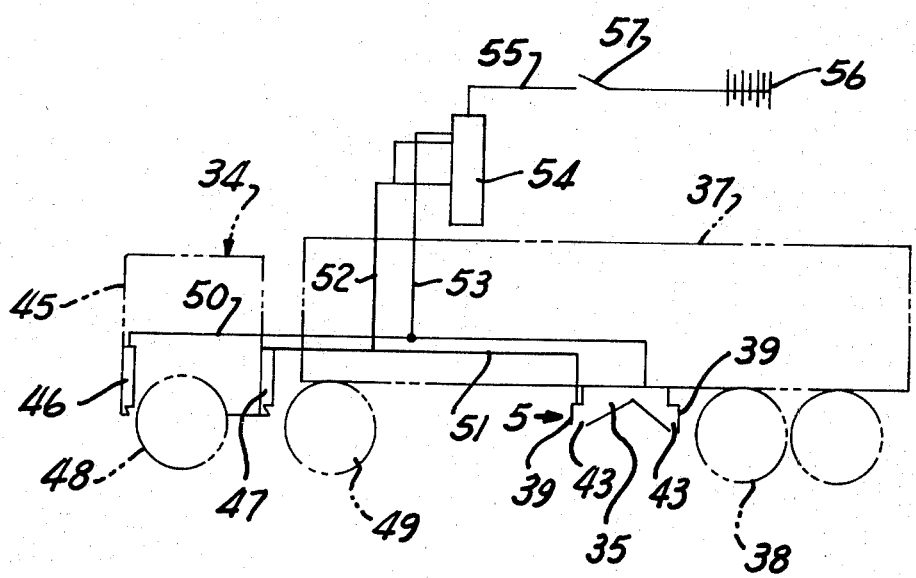
𝐹𝑖𝑔. 8

SEQUENTIALLY POSITIONED TRACK SANDING HOPPER OUTLETS

This invention relates to automotive vehicles; more particularly, to safety devices for automotive vehicles; still more particularly, to a safety device in the form of a sanding appliance that will prevent the wheels of a vehicle from slipping when the vehicle is traveling over ice covered roads or the like.

It is well known to those experienced in the art of providing safety devices for automotive vehicles, as well as to those versed in the study of automobile accidents and highway safety, that while vehicle tires provided with studs will generally speaking, keep a vehicle from slipping on ice, that a number of states as well as at least one foreign country have passed laws preventing the use of studded tires. Studded tires obviously reduce the life of a highway.

It is therefore the principal object of this invention to provide a safety device for automotive vehicles traveling on ice covered highways and the like that can be used on vehicles traveling in any state or country without violating its laws.

Another object of this invention is to provide a safety device for automotive vehicles traveling on ice covered highways and the like that is activated by the driver of the vehicle whenever necessary.

Another object of this invention is to provide a safety device for automotive vehicles traveling on ice covered highways and the like, the device employing sand to be dropped in front of the wheels of the vehicle by the operator of the vehicle activating an electromagnetic mechanism, as will hereinafter be described, and the sand to be automatically released by the action of the brake pedal.

Another object of this invention is to provide a safety device for automotive vehicles traveling on ice covered highways and the like, the device embodying plastic tanks in which the sand is carried, the sand preferably containing a certain herein described chemical that will keep it dry and functional.

Another object of this invention is to provide a safety device for automotive vehicles traveling on ice covered highways and the like, the device being suitably for adaptation to any automotive vehicle, such as a passenger car, truck, or truck and trailer, or bus.

Still another object of this invention is to provide a safety device for automotive vehicles traveling on ice covered highways and the like, the device not having to be removed from the vehicle to prevent wear when not in use in the summer months.

Other objects and advantages of this invention will no doubt appear to those experienced in the art and to those experienced with the problems of safety of automotive vehicle travel over icy highways on the reading of this specification and its appended claims when taken in connection with an examination of the accompanying drawings.

In the drawings:

FIG. 1 is a side view of this invention mounted in a passenger carrying automotive vehicle. Only the invention is shown in solid black lines.

FIG. 2 is a top view of FIG. 1.

FIG. 3 is a side view of this invention mounted in a tractor trailer, the tractor trailer being shown in phantom lines since it is not a part of the invention.

FIG. 4 is a side view of this invention mounted in a school bus which is drawn in phantom lines since it is not a part of the invention.

FIG. 5 is a laterally disposed view of that form of the detail of this invention as indicated by the arrowed line and the number 5 in FIG. 8.

FIG. 6 is a sectional view of a detail of this invention, taken substantially along line 6—6 of FIG. 5, and viewed in the direction indicated by the arrows.

FIG. 7 is a side diagrammatic view of this invention as adapted to a truck or the like.

FIG. 8 is a side diagrammatic view of this invention as adapted to a truck and trailer.

In the several views of this invention and its adaptation to various forms of automotive vehicles, like numbers indicate like parts of the invention.

Directing ones attention first to FIGS. 1 and 2 of the accompanying drawings it will be seen that this invention, when adapted to a passenger carrying vehicle, consists of tanks 10 and 11 that are mounted forward of the front wheels of the automobile 12. The just mentioned tanks are filled with sand that is released in front of the front wheels of the vehicle when it is traveling on ice covered highways or the like. The top of each tank is provided with an electromagnet 13. The aforesaid electromagnet 13 of each tank is connected together by an electric wire or the like 14 that is in turn connected by the electric wire 15 to the electric wire 16 that leads to electric wire 17 which in turn is connected to the two electromagnets 18, one of which is located in the top of the two rear wheel sand tanks 19 and 20.

It should be noted at this time that all wires hereinafter referred to in this specification and claims are electricity carrying wires.

A wire 21 branches off from the aforesaid wire 15 to the brake pedal switch 22, the brake pedal switch being adapted to activation by the movement of the brake pedal. From brake pedal switch 22 a wire leads to the off and on switch 23 which is connected by wire 24 that is in turn connected to a fuse box 25, fuse box 25 being of course connected to the electric system of the vehicle. It is to be realized that the location of the aforesaid parts of this invention are not necessarily in the exact places illustrated in the already mentioned FIGS. 1 and 2 of the drawings.

Looking now at FIGS. 3 and 4 of the accompanying drawings it will be seen by these two figures that this invention can be adapted to both a tractor and trailer and a school bus as well as to the just described passenger vehicle (automobile) 12. The invention, as illustrated in the just mentioned FIGS. 3 and 4 as well as in all of the other figures of the accompanying drawings other than FIGS. 5 and 6, is obviously in the semi-diagrammatic form.

In FIG. 3, the front wheel sand tanks are indicated by the reference number 26, while the rear wheel sand tanks of the tractor 27 are indicated by the reference number 28. The sand tanks of the rear wheels of the trailer 29 are indicated by the reference number 30.

In FIG. 4, the front wheel sand tanks of the school bus 31 are indicated by the reference number 32 while number 33 indicates the sand tanks for the rear wheels of the same aforesaid school bus 31.

Looking now at FIGS. 5, 6, and 8, it will be seen in the drawings that there is herein illustrated that form of this novel invention when it is adapted to sand the highway in front of the rear wheels of a tractor trailer 34.

In this adaptation, the invention embodies a dual sand tank 35 that is made dual by reason of its vertically disposed partition 36, as one can see by looking at the already mentioned FIG. 8 of the drawings.

There is of course one sand tank 35 under each side of the trailer portion 37 of the tractor trailer 34, the aforesaid tanks being located forward of the dual wheels 38. The front and rear end of each sand tank 35 is provided with a valve housing 39 that may or may not be removable from the often mentioned sand tank for reasons of maintenance or repair. Each valve housing 39 contains a vertically disposed valve 40 that has an upwardly extending rod 41 which slidably terminates in its controlling electromagnet 42. The lower end of each valve slidably fits into the upper end of the sand outlet 43, as one can see by examination of FIG. 6 of the drawings.

Examination of FIG. 5 shows that each sand outlet 43 is so configurated as to permit the spreading of the sand in front of both of the aforesaid dual wheels 38. The front plate 44 of each aforesaid said outlet 43 extends downward far enough below the actual sand outlet to prevent the sand from being blown forward away from the wheels when the vehicle is in forward motion.

Continuing to look at FIG. 8 of the accompanying drawings it will be seen that the tractor portion 45 of the aforesaid tractor trailer 34 is provided with sand tanks 46 and 47 for sanding the highway in front of the front and rear wheels 48 and 49 of the aforesaid tractor portion 45 of the vehicle. Electric wires 50, 51, 52, and 53 connect the electromagnets of each valve to the distributing unit 54 which in turn is connected by wire 55 to the electric battery 56 of the vehicle. An electric brake pedal switch 57 controls the activation of the aforesaid electromagnets of this invention.

It will no doubt be realized by those experienced in the art on examination of FIG. 8 of the accompanying drawings that the purpose of having a sand tank provided with a partition and two separate valves is to permit the operator of the vehicle to either release a small amount of sand on movement of his brake pedal if the icing is light on the highway, or in an emergency, such as the discovery of heavy icing or a severe skid of the vehicle due to the emergency, of full application of the brakes, the forward valve of the aforesaid sand tank 35 can be opened and a much larger amount of sand can be released in front of the vehicles rear wheels. It may even be desirable to adapt a two way electric control switch in the electric system for this purpose.

FIG. 7 of the drawings is a semi-diagrammatic side view of this invention adapted to either a bus or an ordinary four wheel truck or the like. Since the parts of the invention illustrated in this Figure are identical to those already mentioned in FIG. 8, the parts are indicated by the same reference numbers are previously mentioned in the early part of this specification.

From the reading of the above description of this novel invention it will be realized that there is herein presented a new and practical safety device for automotive vehicles likely to travel on ice covered highways and the like. The sand that is placed in the sand tanks of this invention should be thoroughly mixed with calcium chloride ($CaCl_2$) in order to keep it dry and functional. It will be obvious to those experienced in the art that upon reading FIGS. 1, 2, 7, and 8 of the accompanying drawings, that all one has to do in order to place sand in front of the wheels of the vehicle is to press on the aforesaid brake pedal switch 22, after being sure that the already mentioned off and on switch 23 is in the on position. The activating of the brake pedal switch 22 will cause the electromagnets that raise and lower the valves in the sand tanks located in front of the wheels of the vehicle to open and thus let the sand pour down on the highway in front of the wheels. This sand will naturally give the wheels traction and thus prevent the vehicle from skidding.

It is to be fully realized that the mechanism of this novel invention can be connected in other ways to activate the valves of the same tanks. The valves of the tanks are preferably made of plastic, as well as is the master sand supply tank and its connecting tubing if one is used, as it may be desirable to have an extra supply of sand in an auxiliary tank, the sand can be released to the above described sand tanks at will by the operator merely by the turning of one or more control valves. This just mentioned auxiliary sand tank and its supply tubing and control valves is not shown in any of the views of the accompanying drawings for reasons of clarity.

Although it has not been previously mentioned nor illustrated in any of the numerous views of the accompanying drawings, it is quite possible that this invention can also be mounted in the fuselage of an airplane. The outlet of each sand tank is connected to a flexible tube that terminates in the front of each wheel of the airplane. The invention may also be adapted to mounting on a motorcycle or the like with the outlet of the sand tank terminating in front of the rear wheel of the motorcycle. A sand tank could also be mounted on a sidecar of a motorcycle in such a way as to release sand in front of the sidecars wheel, if it is so desired.

It is to be thoroughly understood that the valves of this novel invention can, if it is so desired, be activated through a pressurized or cable-operated link-up, also that the sand tanks can be made of any desired material.

This invention of ours is subject to any and all changes in detail design and/or modifications in so long as the changes in detail design and/or modifications all fall within the scope and intent of the appended claims.

What we now claim as new and desire to secure by Letters Patent is:

1. An apparatus for use with an automobile for improving the traction of the vehicle especially when traveling on ice covered highway or the like comprising;
    a tank associated with at least the rear wheels of the automobile;
    means for mounting the tank adjacent a wheel and forward of the wheel when traveling in its normal forward direction of travel;
    a partition separating said tank into first and second compartments each of which contains an amount of sand;
    a first outlet defined in said first compartment and a second outlet defined in said second compartment;
    and first and second valve means disposed respectively in said first and second outlets;
    one of said outlets being disposed sequentially closer to its associated wheel than the other of said outlets.

2. The apparatus of claim 1 comprising means for separately actuating said first and second valve means.

3. The apparatus of claim 2 wherein one of said outlets is constructed to pass more sand over a given time period than the other of said outlets.

4. The apparatus of claim 3 wherein the outlet that is closest to the associated wheel dispenses more sand when opened than the other outlet.

5. The apparatus of claim 4 wherein each outlet is defined by a wall that depends downwardly at the forward end of the outlet to prevent sand from being blown forward of the associated wheel.

6. The apparatus of claim 5 wherein said tank bottom is defined by a pair of oppositely slanted walls one wall defining a part of each compartment.

7. The apparatus of claim 6 wherein the compartment closest to the associated wheel is smaller than the other compartment.

* * * * *